(12) United States Patent
Tang et al.

(10) Patent No.: US 10,747,508 B2
(45) Date of Patent: Aug. 18, 2020

(54) FUNCTION BLOCK FRAMEWORK GENERATION

(71) Applicant: Rockwell Automation Technologies, Inc., Mayfield Heights, OH (US)

(72) Inventors: Benfeng Tang, Shanghai (CN); Tao Song, Shanghai (CN); LingLai Li, Shanghai (CN); Zhen Wei, Shanghai (CN); Bingchao Tang, Shanghai (CN); David W. Siegler, Mequon, WI (US); David B. Berman, Milwaukee, WI (US); John P. Caspers, Milwaukee, WI (US); Jeffrey S. Martin, Milwaukee, WI (US); Liz V. Bahl Prosak, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/237,467

(22) Filed: Dec. 31, 2018

(65) Prior Publication Data

US 2020/0210154 A1    Jul. 2, 2020

(51) Int. Cl.
    *G06F 8/36* (2018.01)
    *G06F 8/70* (2018.01)
    (Continued)

(52) U.S. Cl.
    CPC .............. *G06F 8/36* (2013.01); *G06F 8/24* (2013.01); *G06F 8/311* (2013.01); *G06F 8/41* (2013.01);
    (Continued)

(58) Field of Classification Search
    CPC ..... G06F 8/24; G06F 8/36; G06F 8/41; G06F 8/70; G06F 8/311; G06F 9/44505;
    (Continued)

(56) References Cited

U.S. PATENT DOCUMENTS

| | | | |
|---|---|---|---|
| 7,822,495 B2 * | 10/2010 | Nixon | G05B 19/0426 700/28 |
| 8,726,241 B1 | 5/2014 | Limondin et al. | |

(Continued)

FOREIGN PATENT DOCUMENTS

| | | |
|---|---|---|
| EP | 2357541 A1 | 8/2011 |
| EP | 2838014 A1 | 2/2015 |

OTHER PUBLICATIONS

EPO, Extended European Search Report, dated May 22, 2020, pp. 1-8.

*Primary Examiner* — Ryan D. Coyer
(74) *Attorney, Agent, or Firm* — Kunzler Bean & Adamson

(57) ABSTRACT

For function block framework generation, a method generates a function block framework for a hardware device. The function block framework includes function block framework source code and a function block framework description. The hardware device includes a logic engine and automation hardware. The function block framework presents a standard interface to a function block core executed by the logic engine. The method instantiates the function block framework and the function block core as an executable image for the hardware device. The method further configures the logic engine to execute the executable image using the function block framework description. The method executes the executable image with the logic engine.

20 Claims, 18 Drawing Sheets

(51) Int. Cl.
    *G06F 8/41*          (2018.01)
    *G06F 8/20*          (2018.01)
    *G06F 9/445*        (2018.01)
    *G06F 11/36*        (2006.01)
    *G06F 8/30*          (2018.01)

(52) U.S. Cl.
    CPC ............ *G06F 8/70* (2013.01); *G06F 9/44505* (2013.01); *G06F 9/44542* (2013.01); *G06F 9/44589* (2013.01); *G06F 11/3608* (2013.01); *G06F 11/3672* (2013.01)

(58) Field of Classification Search
    CPC ............ G06F 9/44589; G06F 9/44542; G06F 11/3608; G06F 11/3672
    USPC ........................................................ 718/108
    See application file for complete search history.

(56) References Cited

U.S. PATENT DOCUMENTS

| | | | | |
|---|---|---|---|---|
| 2003/0195639 | A1* | 10/2003 | Nixon ................ | G05B 19/0426 700/19 |
| 2009/0064111 | A1* | 3/2009 | Kornerup ................ | G06F 8/34 717/126 |
| 2011/0009985 | A1* | 1/2011 | Nixon ................ | G05B 19/0426 700/87 |
| 2014/0059524 | A1* | 2/2014 | Kee ........................ | G06F 8/34 717/154 |
| 2015/0339127 | A1* | 11/2015 | Lee ...................... | G06F 9/4411 713/1 |
| 2017/0131976 | A1* | 5/2017 | Valdez .................... | G06F 8/34 |

* cited by examiner

FUNCTION BLOCK FRAMEWORK GENERATION

BACKGROUND INFORMATION

The subject matter disclosed herein relates to the generation of function block frameworks for intelligent hardware devices.

BRIEF DESCRIPTION

A method for function block framework generation is disclosed. The method generates a function block framework for a hardware device. The function block framework comprises function block framework source code and a function block framework description. The hardware device comprises a logic engine and automation hardware. The function block framework presents a standard interface to a function block core executed by the logic engine. The method instantiates the function block framework and the function block core as an executable image for the hardware device. The method further configures the logic engine to execute the executable image using the function block framework description. The method executes the executable image with the logic engine.

An apparatus for function block framework generation is disclosed. The apparatus comprises a processor and a memory storing code executable by the processor to generate a function block framework for a hardware device. The function block framework comprises function block framework source code and a function block framework description. The hardware device comprises a logic engine and automation hardware, and the function block framework presents a standard interface to a function block core executed by the logic engine. The processor instantiates the function block framework and the function block core as an executable image for the hardware device. The processor further configures the logic engine to execute the executable image using the function block framework description. The processor executes the executable image with the logic engine.

A computer program product for function block framework generation is also disclosed. The computer program product comprises a non-transitory computer readable storage medium having program code embedded therein. The program code is readable/executable by a processor to generate a function block framework for a hardware device. The function block framework comprises function block framework source code and a function block framework description. The hardware device comprises a logic engine and automation hardware, and the function block framework presents a standard interface to a function block core executed by the logic engine. The processor instantiates the function block framework and the function block core as an executable image for the hardware device. The processor further configures the logic engine to execute the executable image using the function block framework description. The processor executes the executable image with the logic engine.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
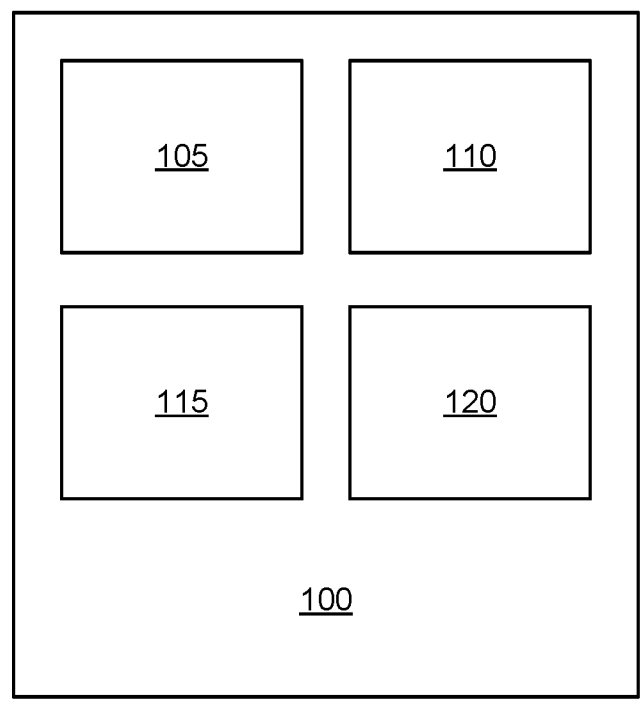
FIG. 1A is a schematic block diagram of a hardware device according to an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Python, Java, JavaScript, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1A is a schematic block diagram of a hardware device 100. The hardware device 100 may perform an automation function. For example, the hardware device 100 may be a motor drive, a motor controller/protector, input/output controller, or the like. In the depicted embodiment, the hardware device 100 includes a logic engine 105, a device memory 110, automation hardware 115, and communication hardware 120.

The device memory 110 may store code and data as will be described hereafter in FIG. 1B. The logic engine may execute the code and manipulate the data. The communication hardware 120 may communicate with other devices. The automation hardware 115 may perform the automation function.

The knowledge of how to program the hardware device 100 may reside in different people. For example, a device developer may best understand the automation hardware 115 and functions performed by the automation hardware 115. However, a runtime library developer may best understand how to integrate executable code for the hardware device 100 into a library of functions. Similarly, a utility tool developer may best understand how to deploy and make available the executable code created by the device developer. An end user may best understand how to configure the executable code to realize an actual application logic in an automation environment.

The embodiments described herein provide a unique development structure based on a function block framework that enables each developer to fully utilize his expertise to develop fully integrated, shareable, and reusable code for the hardware device 100. As a result, the development of executable code for the hardware device 100 is more rapid and efficient. In addition, the development costs of the executable code for multiple implementations is greatly reduced.

Figure 1B:
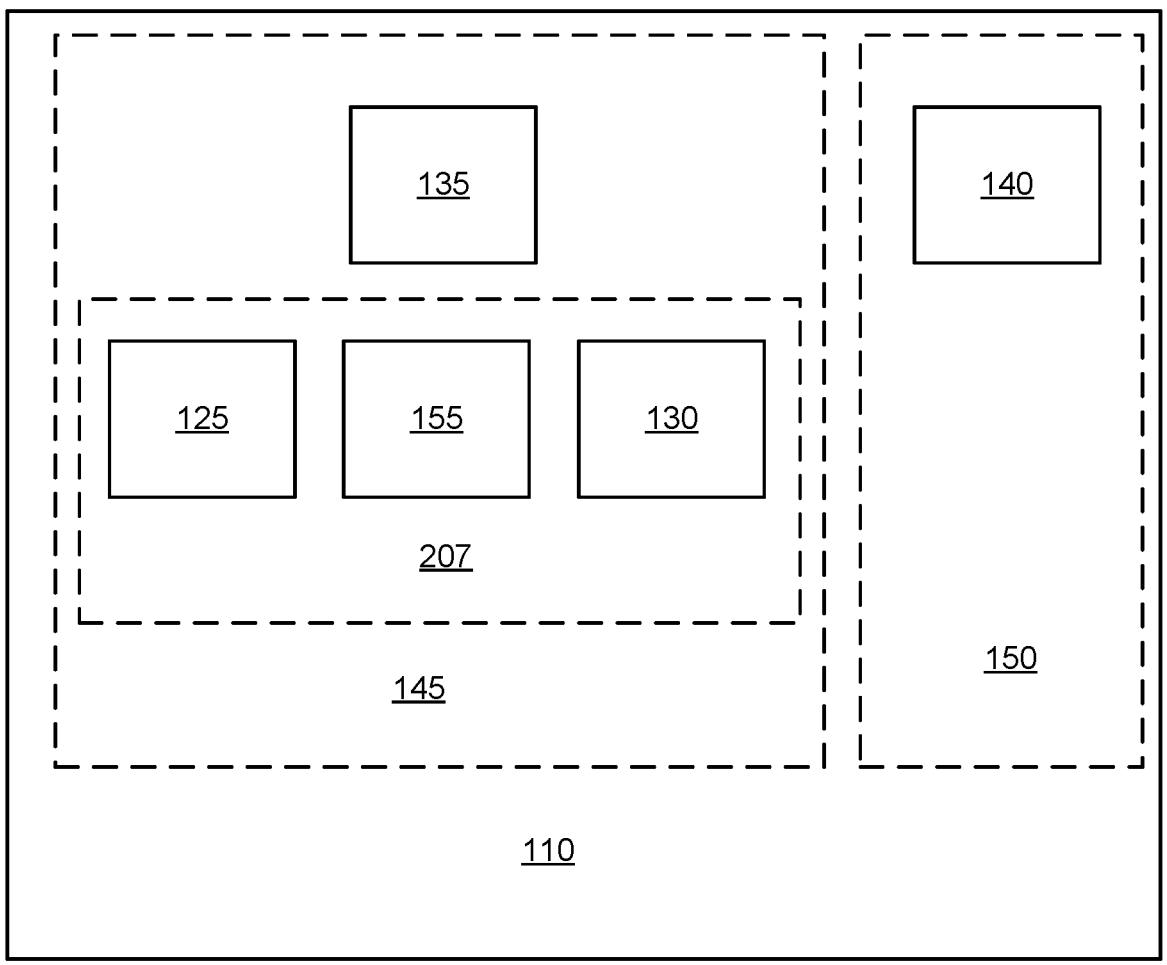
FIG. 1B is a schematic block diagram of a device memory according to an embodiment.

FIG. 1B is a schematic block diagram of the device memory 110. In one embodiment, the device memory 110 includes nonvolatile memory 145 and volatile memory 150. The nonvolatile memory 145 may retain all code, instructions, and data when the device memory 110 is powered down. All code, instructions, and data in the nonvolatile memory 150 may be lost when the device memory 110 is powered down.

In the depicted embodiment, the nonvolatile memory includes a data table 135, a function block framework 125, at least one function block 155, and a function block core 130. The function block core 130 may execute on the logic engine 105 to control the hardware device 100. The function block framework 125 may interface with the data table 135 and the function block 155 for the function block core 130. The function block framework 125 may also interface with other data sources and/or device interfaces as will be described hereafter. The function block framework 125, one or more function blocks 155, and function block core 130 may be embodied in an executable image 207. The volatile memory 150 may include one or more secondary data tables 140. The function block framework 125 may interface with the one or more secondary data tables 140.

Figure 2A:
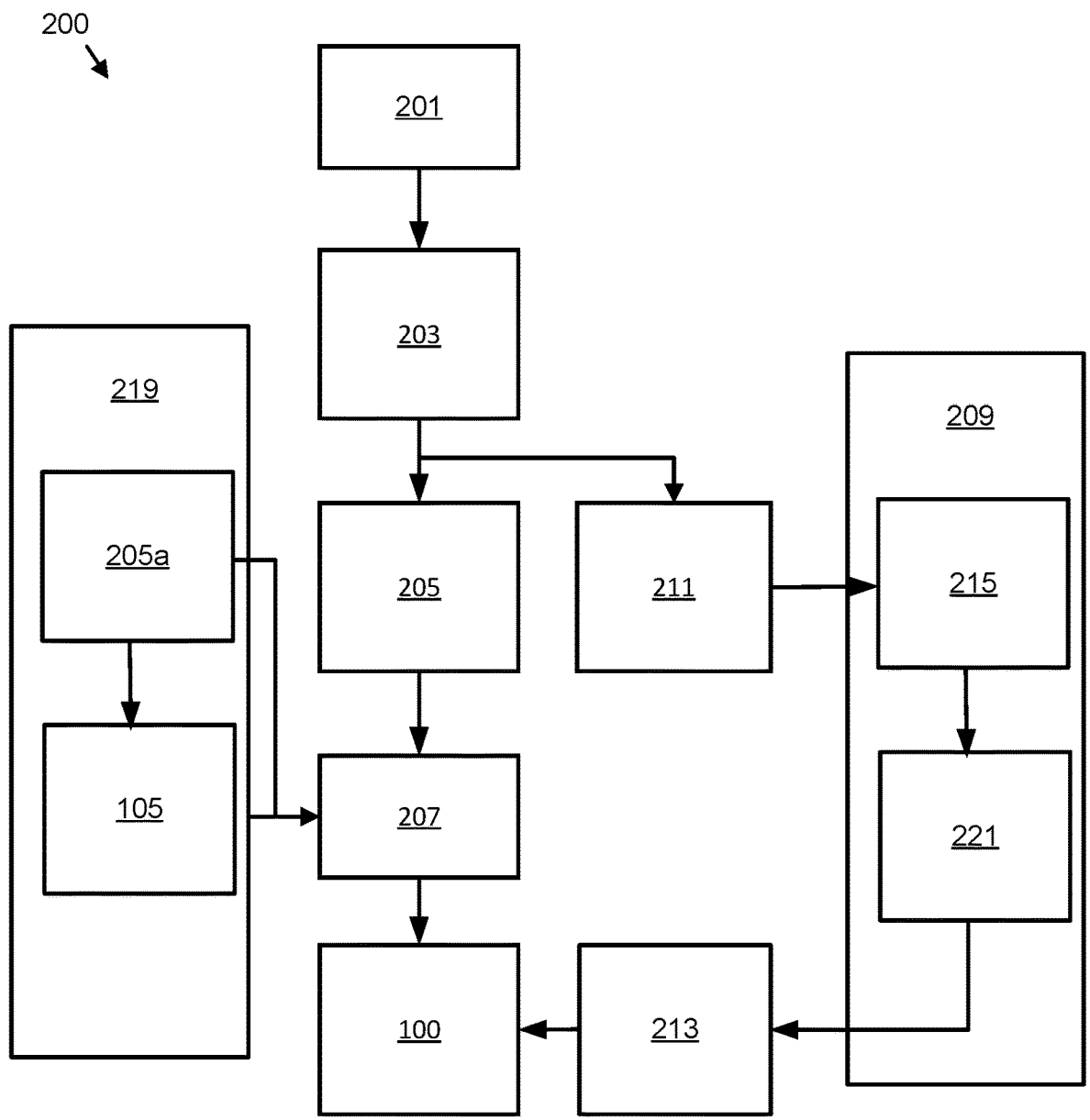
FIG. 2A is a schematic block diagram of an executable image generation system according to an embodiment.

FIG. 2A is a schematic block diagram of an executable image generation system 200. The executable image generation system 200 may develop an executable image 207 for the hardware device 100. In the depicted embodiment, the system 200 includes core functions 201, a utility tool 203, function block framework source code 205, an application logic editor 209, function block framework descriptions 211, the executable image 207, application logic 213, and a development library 219.

The function block framework 125 and the function block core 130 may be stored as reusable library elements in the development library 219. The function block framework 125 may be stored in the development library 219 as function block framework source code 205a as shown. The development library 219 may contain common function block framework source code 205a and logic engines 105 for one or more hardware devices 100. The common function block source code 205a may realize fundamental algorithms.

The device developer may develop the core functions 201. In one embodiment, the core functions 201 are developed in a high-level source code language or generated by other tools like MATLAB/Simulink. The high-level source code language may by C, C++, C sharp, Java, Java Script, Python, and the like. The utility tool 203 may generate function block framework source code 205 from the core functions 201. The function block framework source code 205 may include one or more of common function block framework source code 205a from the reusable library elements and custom function block framework source code 205.

In addition, the utility tool 203 may generate a function block framework description 211 from the core functions 201. The function block framework description 211 may be an extensible markup language (XML) file.

The logic engine 105 may process the common function blocks 155 from the common function block framework source code 205a through a specific interface of the function blocks 155. The logic engine 105 may also process function blocks 155 constructed with function block framework source code 205 and a core function 201.

The development library 219 may further include logic engines 105 for one or more hardware devices 100. The library developer may add logic engines 105 to the development library 219. The logic engines 105 may be accessible for use by the executable image 207.

The logic program editor 209 may include a function block information interpreter 215. The editor developer may create and/or modify the function block information interpreter 215. The function block information interpreter 215 may generate visualized function blocks 221 from the function block framework description 211. The visualized function blocks 221 may be presented as signal logic blocks, Boolean logic blocks, combinational logic blocks, Boolean equations, and the like. A user and/or computer may employ the visualized function blocks 221 in generating the application logic 213 that interfaces with the hardware device 100. The application logic 213 may include common function blocks 155 from common function block source code 205a and custom function blocks 155 from function block framework source code 205.

Figure 2B:
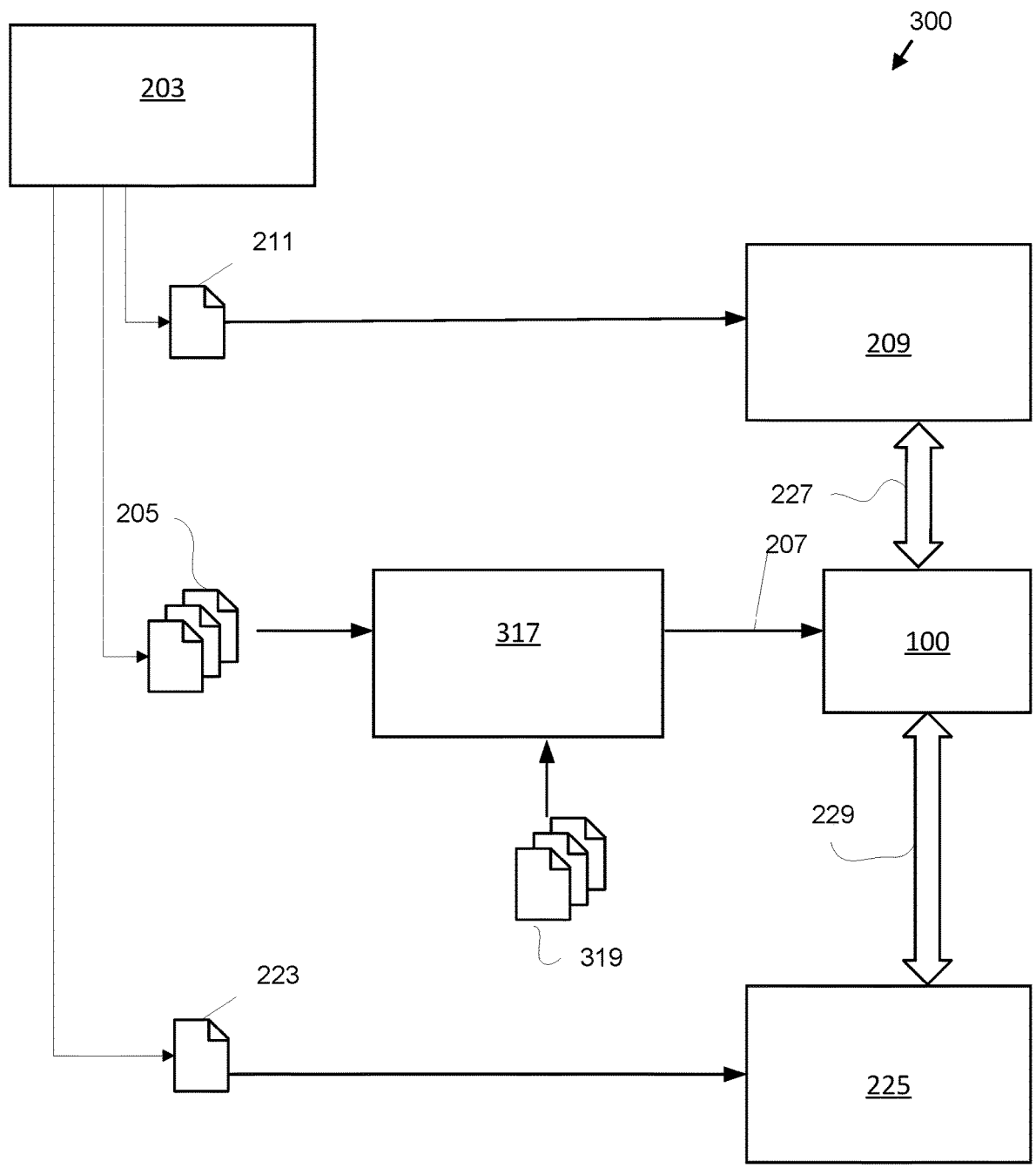
FIG. 2B is a schematic block diagram of an executable image generation process according to an embodiment.

FIG. 2B is a schematic block diagram of an executable image generation process 300. The process 300 may employ the executable image generation system 200 to generate the executable image 207 for the hardware device 100. The executable image 207 may comprise the function block framework 125, the function block core 130 and other functions. In the depicted embodiment, the utility tool 203 generates the function block framework source code 205 and the function block framework description 211. In addition, the utility tool 203 may generate the function block test description 223.

In one embodiment, the device developer employs the utility tool 203 to define and generate the function block framework source code 205, the function block framework description 211, and/or the function block test description 223. The device developer may require no knowledge of the logic engine 105, device memory 110, and/or communication hardware 120.

In one embodiment, the function block framework source code 205 is integrated with function block core function source code 319 for a logic engine 105 to be a part of a device firmware project 317. The device firmware project 317 may be compiled to generate the executable image 207 for the hardware device 100.

The function block description 211 may be used by the application logic editor 209 to generate configuration parameters 227 for the hardware device 100. In addition, the test function block description 223 may be used by an automated test tool 225 to generate test vectors 229 for the hardware device 100. The automated test tool 225 may further employ the test function block description 223 to test the executable image 207 on the hardware device 100. The test vectors 229 may be used to test the executable image 207 on the hardware device 100. The tested hardware device 100 configured with the configuration parameters 227 and executable image 207 may be released for use.

Figure 3A:
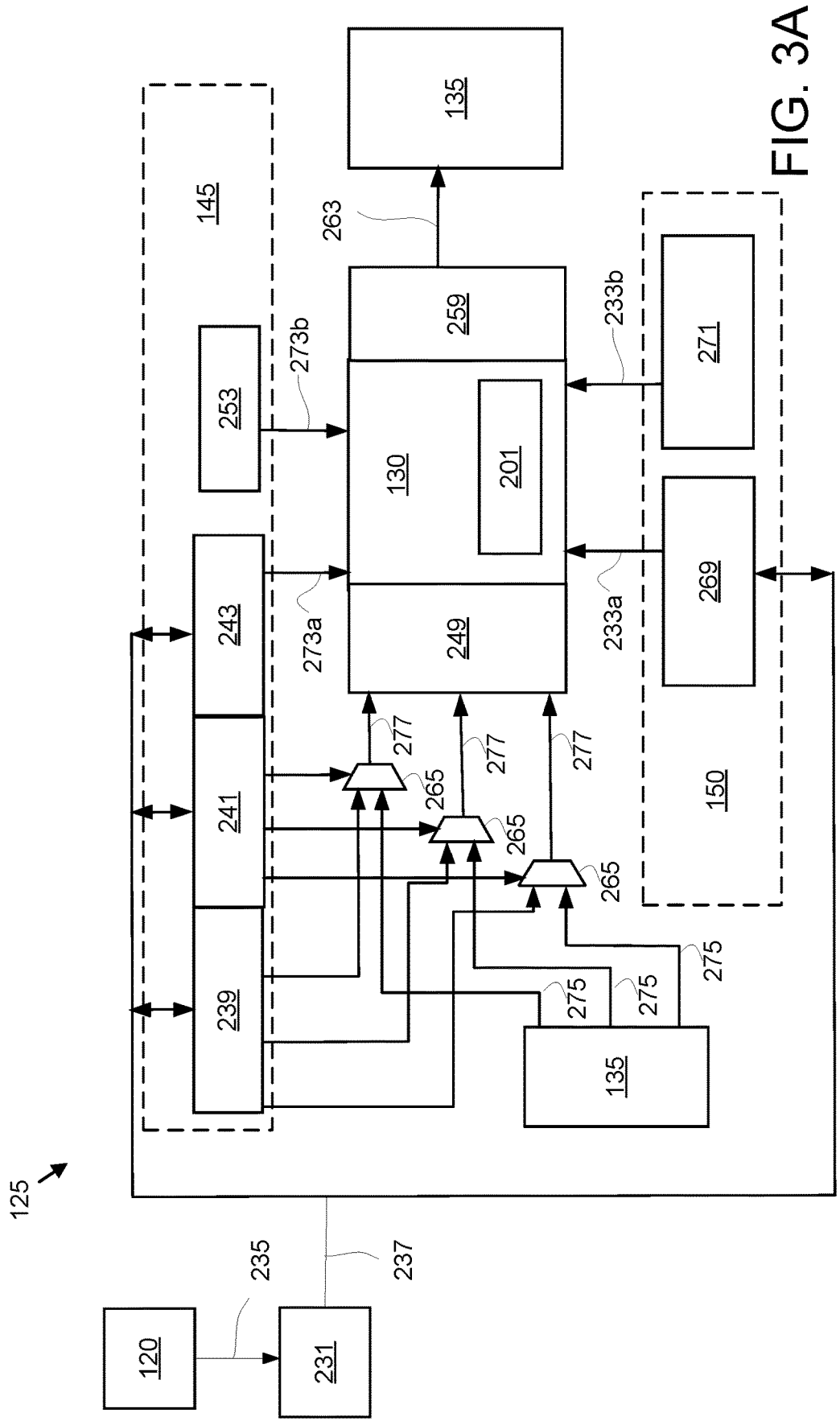
FIG. 3A is a schematic block diagram of function block communications according to an embodiment.

FIG. 3A is a schematic block diagram of function block communications. The depicted embodiment includes the function block core 130. The function block core 130 may reside in the device memory 110 and execute on the logic engine 105. The function block core 130 may get data through an input interface 249 and output data through an output interface 259. The input interface 249 and the output interface 259 may be embodied in the function block framework 125. In addition, the function block core 130 may access the nonvolatile memory 145 and/or the volatile memory 150.

The nonvolatile memory 145 and the volatile memory 150 may be in communication 237 with a function block service 231. The function block service 231 may communicate 235 via the communication hardware 120. In one embodiment, the function block service 231 instantiates the function block framework 125 to the nonvolatile memory 145 and/or to the volatile memory 150.

The nonvolatile memory 145 may store input constants 239, input binding pads 241, nonvolatile parameters with attribute identifiers 243, and nonvolatile parameters without attribute identifiers 253. Attribute identifiers support accessing parameters through the function block service 231 from outside of the hardware device 100. In one embodiment, the nonvolatile parameters with attribute identifiers 243 and nonvolatile parameters without attribute identifiers 253 directly accessible 273a-b by the function block core 130.

The volatile memory 150 may store volatile parameters with attribute identifiers 269 and volatile parameters without attribute identifiers 271. The volatile parameters with attribute identifiers 269 and volatile parameters without attribute identifiers 271 may be directly accessible 233a-b by the function block core 130.

The function block core 130 may access table inputs 275 from the data table 135 and/or the input constants 239 selected by input binding paths 241 via the input interface 249. In one embodiment, selectors 265 select either data from the data table 135 or one of an input constant 239 based on the input binding paths 241 for input 277 to the input interface 249. The use of the selectors 265 is technical solution that routes data in an unconventional manner to improve the functionality of the function block core 130. The selectors 265 improve the retrieval of data from the data table 135 by selecting between the input constants 239 and the table inputs 275. Based on the input binding past 241, either an input constant 239 or a table input 275 may be communicated to the input interface 249 and the function block core 130. As a result, the operation of the function block core 130 is enhanced.

If the input binding path 241 is valid, the input 277 is retrieved from the data table 135. If the input binding path 241 is not valid, the input constant 239 is retrieved. The function block framework 125 may specify that the table inputs 275 are from one of the secondary data table 140 in the volatile memory 150 and the data table 135 in the nonvolatile memory 145. The function block core 130 may further put 263 data to the data table 135 via the output interface 259.

Figure 3B:
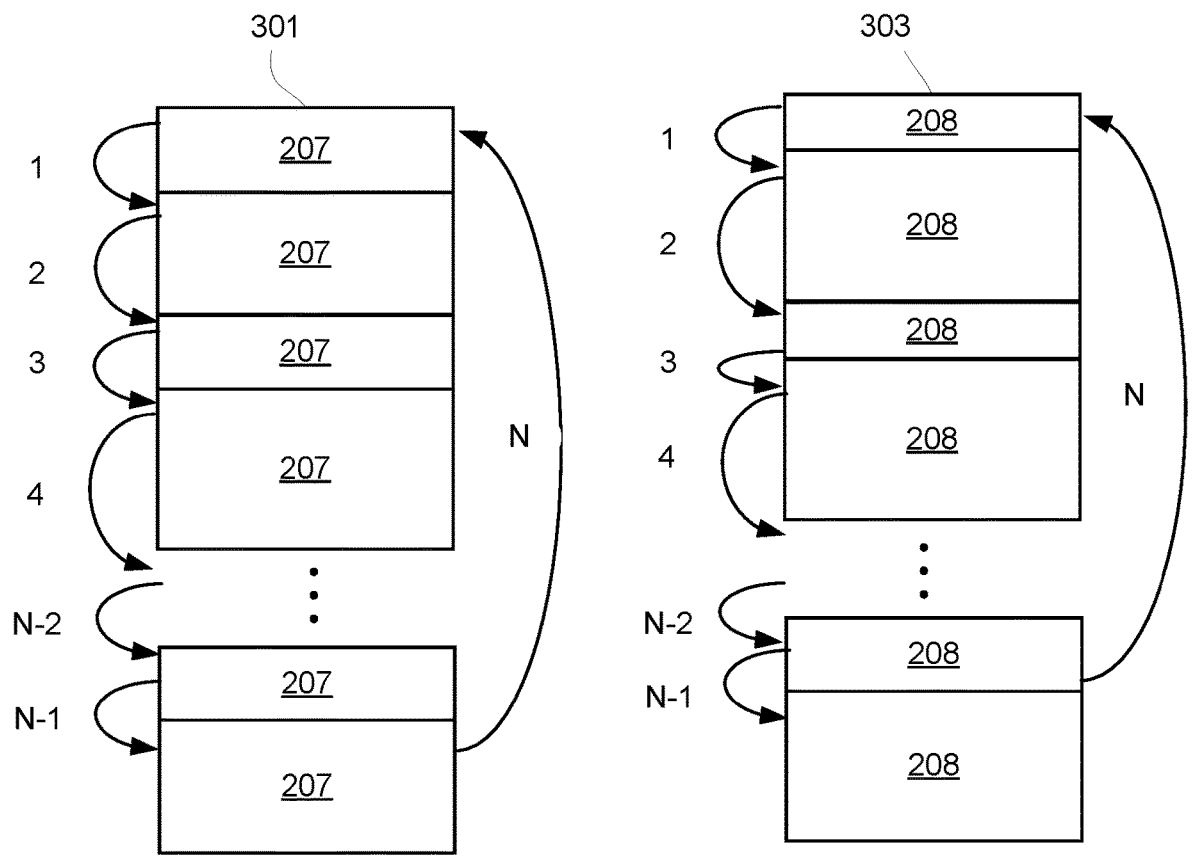
FIG. 3B is a schematic block diagram of function block processing according to an embodiment.

FIG. 3B is a schematic block diagram of function block processing. In the depicted embodiment, a function block configuration 301 is shown with the plurality of executable images 207. The plurality of executable images 207 may reside in the nonvolatile memory 145. Function blocks and/or core functions 201 of the plurality of executable images 207 may be executed sequentially as shown. In addition, function block run-time data 303 with a plurality of function block data 208 is shown. The function block data 208 may reside in the volatile memory 150. Each instance of function block data 208 may be employed by a corresponding executable image 207.

Figure 3C:
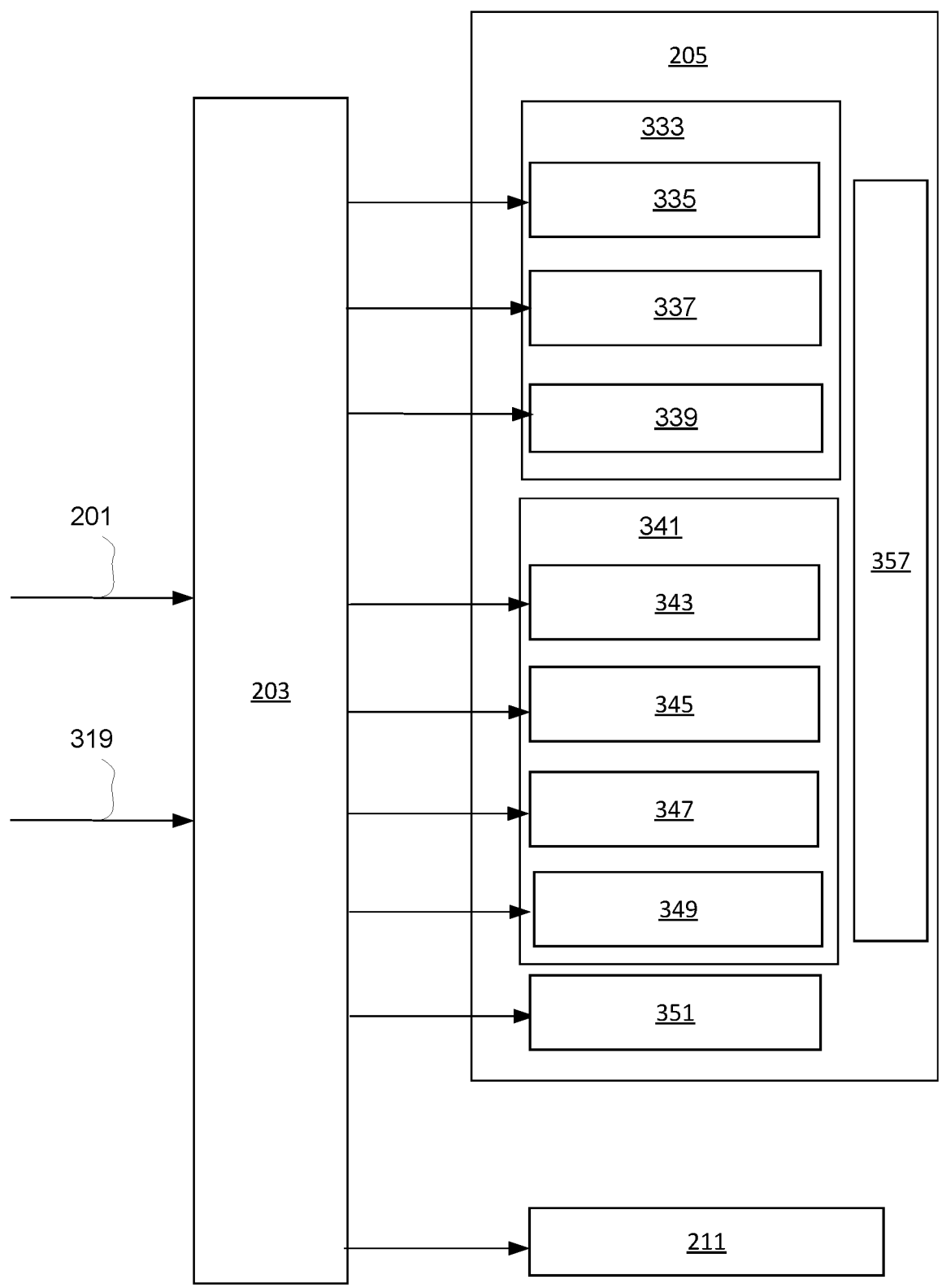
FIG. 3C is a schematic block diagram of a utility tool operation according to an embodiment.

FIG. 3C is a schematic block diagram of the utility tool operation. In the depicted embodiment, the utility tool 203 receives the definitions of core function 201. In addition, the utility tool may receive function block core function source code 319. The utility tool 203 may generate function block data 333 and function block functions 341 for the function block framework source code 205. In addition, the utility tool 203 may generate the function block framework descriptions 211. In one embodiment, the utility tool 203 generates a function block process function 351 for the function block framework source code 205. In a certain embodiment, the utility tool 203 generates function block management data 357 for the function block framework source code 205.

The function block data 333 may include function block input definitions 335, function block output definitions 337, and function block parameter definitions 339. The function block input definitions 335 may define combinations of input constants 239, input binding paths 241, and data from the data table 135 for input 277 to the function block core 130. The function block output definitions 337 may define data that is output 263 to the data table 135. The function block parameter definitions 339 may define the nonvolatile parameters with attribute identifiers 243, nonvolatile parameters without attribute identifiers 253, volatile parameters with attribute identifiers 269, and volatile parameters without attribute identifiers 271.

In one embodiment, the function block functions 341 include a function block instantiation function 343, a function block initialization function 345, a function block verification function 347, and a function block attribute get/set function 349. The function block instantiation function 343 may instantiate the function block framework source code 205 and/or the function block core function source code 319 as the executable image 207. The function block initialization function 345 may initialize the executable image 207 on the logic engine 105. The function block verification function 347 may verify the instantiation and/or initialization of the executable image 207 on the logic engine 105. In addition, the function block verification function 347 may validate parameters 243/253/269/271. The function block attribute get/set function 349 may establish communications between the function block service 231 and the executable image 207.

The function block process function 351 may enable the function block framework 125 of the executable image 207 to interface with the function block core 130. In one embodiment, the function block process function 351 presents a standard interface to communicate with the function block core 130, transferring inputs 277 to the function block core 130 and returning the puts 263.

The function block management data 257 may store management data that is used to organize function block types, including one or more classes, constants, and the like.

The function block framework 125 defines a standard interface to the function block core 130, employing conventional elements in an unconventional way to allow core functions 201 to interface directly with the function block core 130. As a result, standard core functions 201 may be used by nonstandard logic engines 105. In addition, device developers with little experience with the function block core 130 may rapidly and efficiently create executable code 207 for a unique function block core 130 of a highly distinguished hardware device 100. Thus the development of the executable code 207 is greatly enhanced.

Figure 3D:
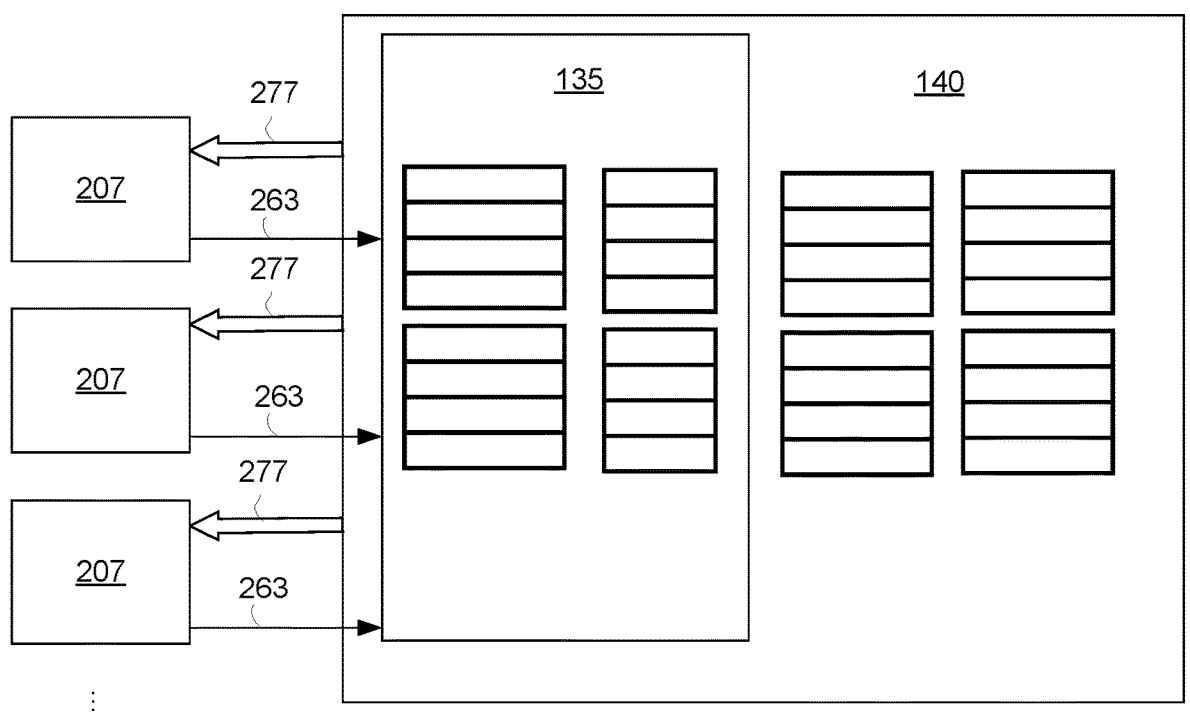
FIG. 3D is a schematic block diagram of data tables according to an embodiment.

FIG. 3D shows a plurality of data tables 135 and a plurality of secondary data tables 140. The plurality of data tables 135 and/or plurality of secondary data tables 140 may communicate inputs 277 to the executable code 207. In addition, the plurality of data tables 135 and/or plurality of secondary data tables 140 may receive puts 263 from the executable code 207.

Figure 4A:
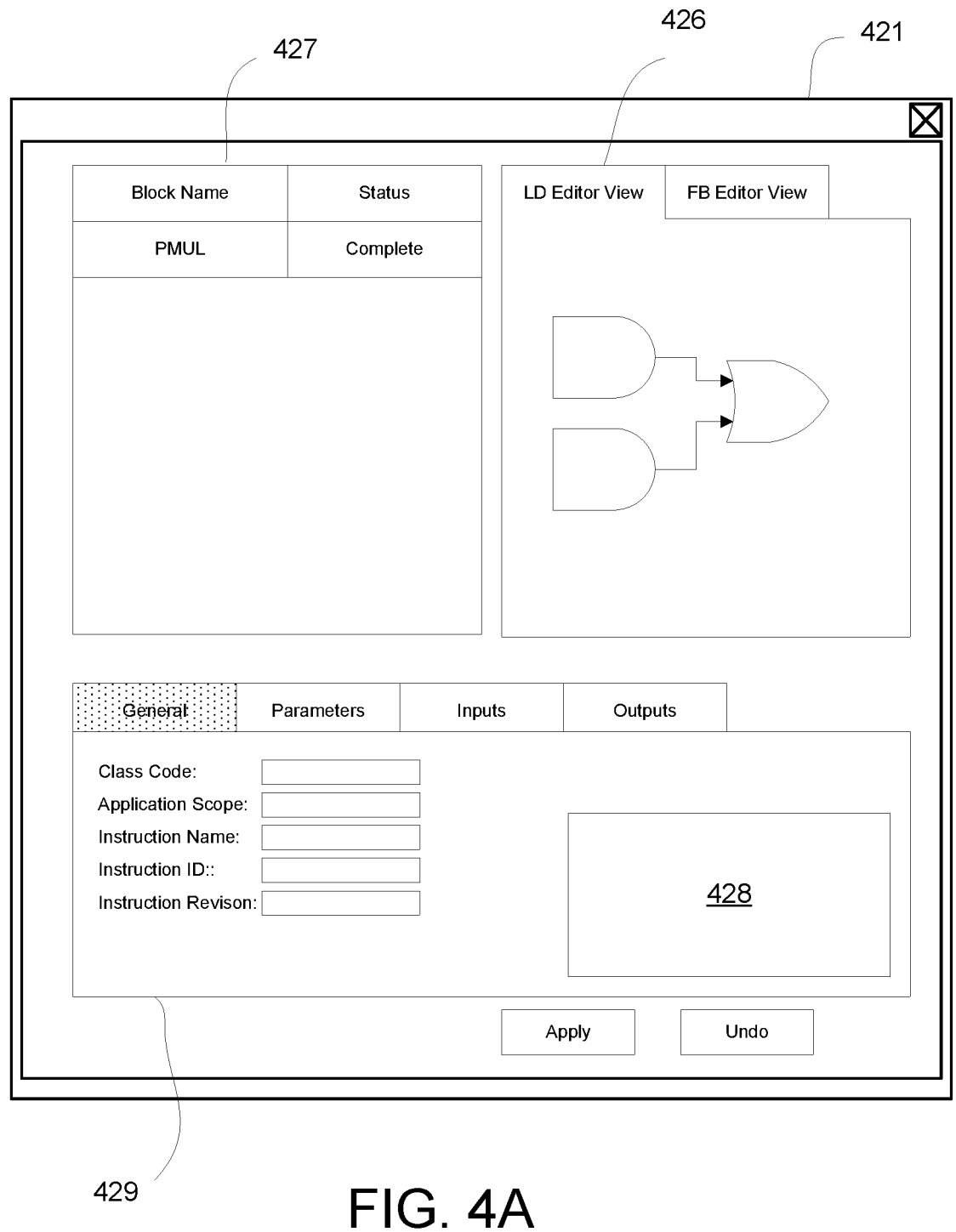
FIGS. 4A-D are drawings of utility tool user interfaces according to an embodiment.

FIGS. 4A-D are drawings of user interfaces 421 of the utility tool 203. In FIG. 4A, the user interface 421 includes a function block table 427, a logic design block editor view 426, and a general input screen 429. The function block table 427 may list one or more function blocks and a corresponding status. The logic design block editor view 426 may display and/or support the entry of a logic design for the function block framework 125 and/or core functions 201. The general input screen 429 may receive one or more descriptions including a class code, an application scope, an instruction name, an instruction identifier, and/or an instruction revision. In addition, the general input screen 429 may receive a function block description 428.

Figure 4B:
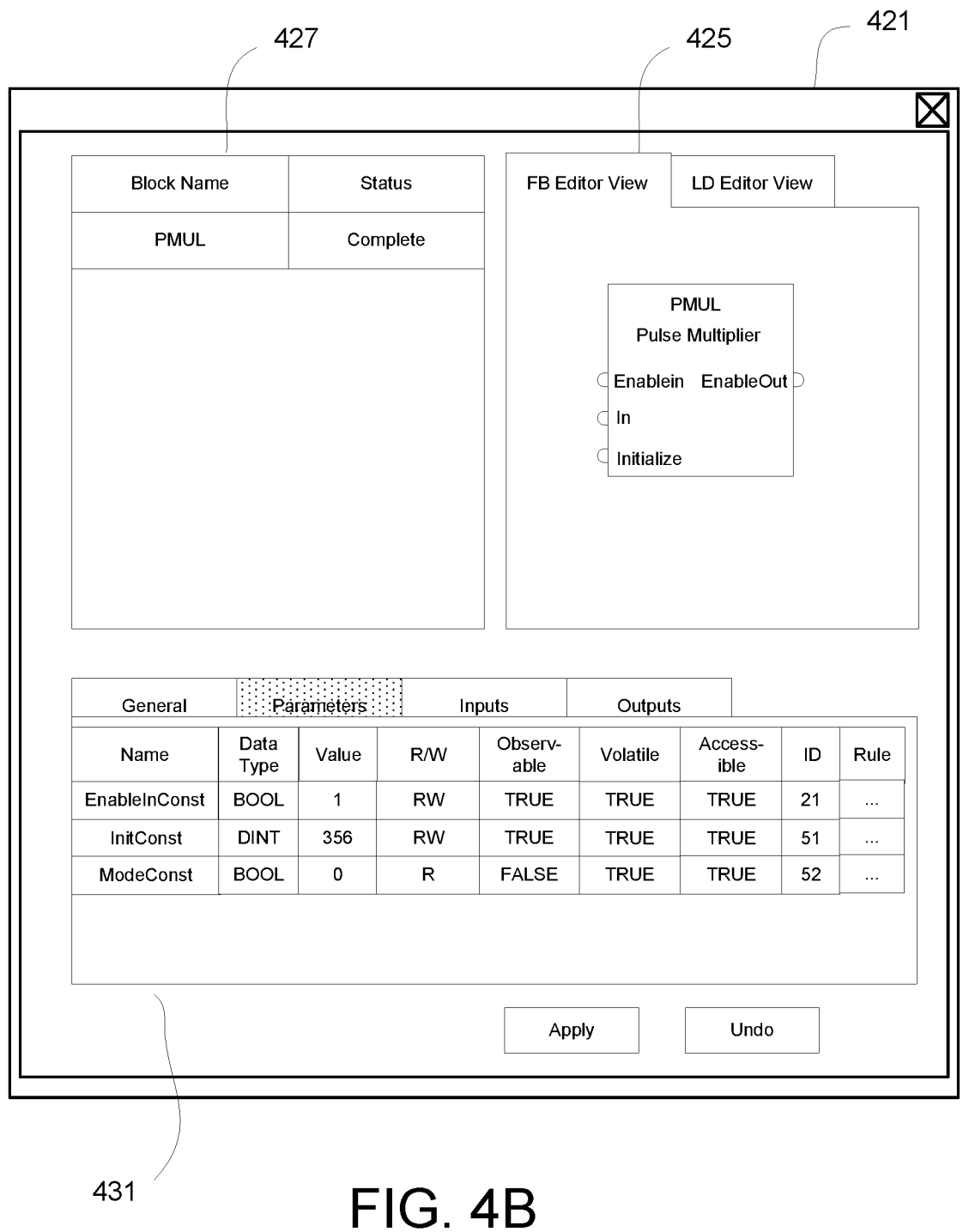

In FIG. 4B, a function block editor view 425 is shown. The function block editor view 425 supports the definitions of the inputs 277 and outputs 263 as core functions 201 for the function block core 130. In addition, a parameter screen 431 is shown. The parameter screen 431 may define a datatype, a value, a read/write parameter, an observable parameter, a volatile parameter, an accessibility parameter, an identifier, and/or input verification rules for each parameter.

Figure 4C:
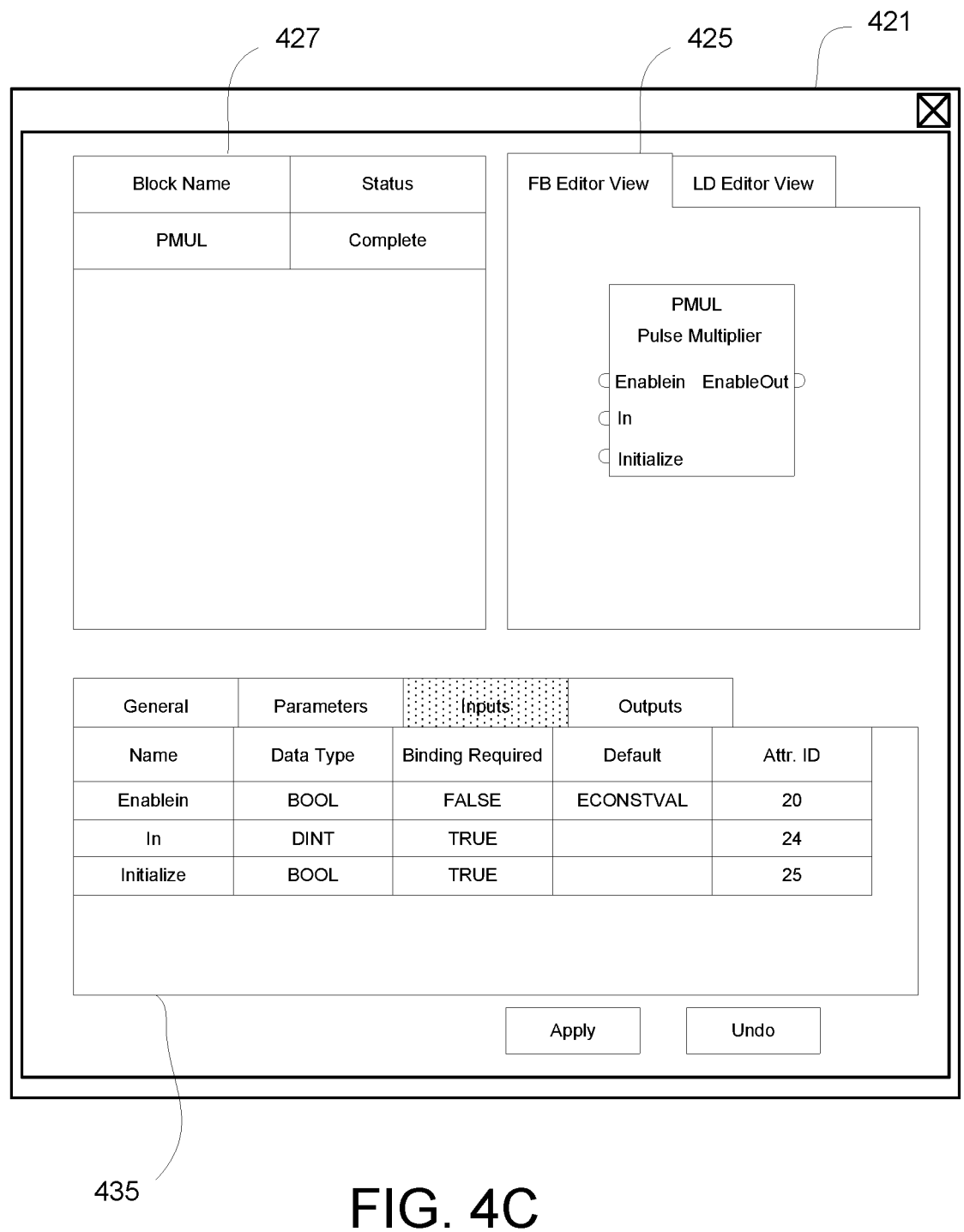
Figure 4D:
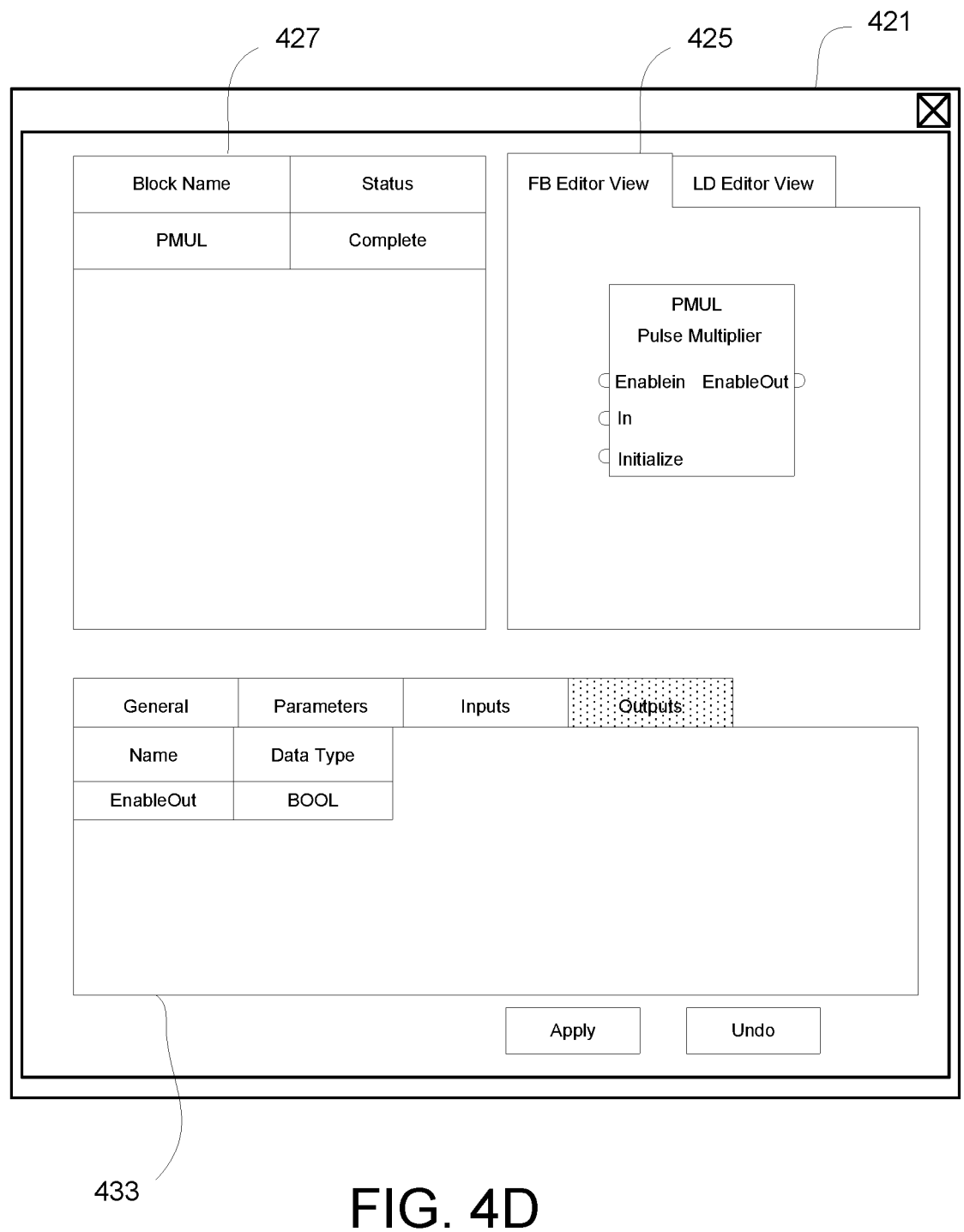

In FIG. 4C, an input screen 435 is shown. The input screen 435 may define a datatype, a binding requirement, a default value, and/or an attribute identifier for each input 277. In FIG. 4D, an output screen 433 is shown. The output screen 433 may define a data type for each output 263.

Figure 4E:
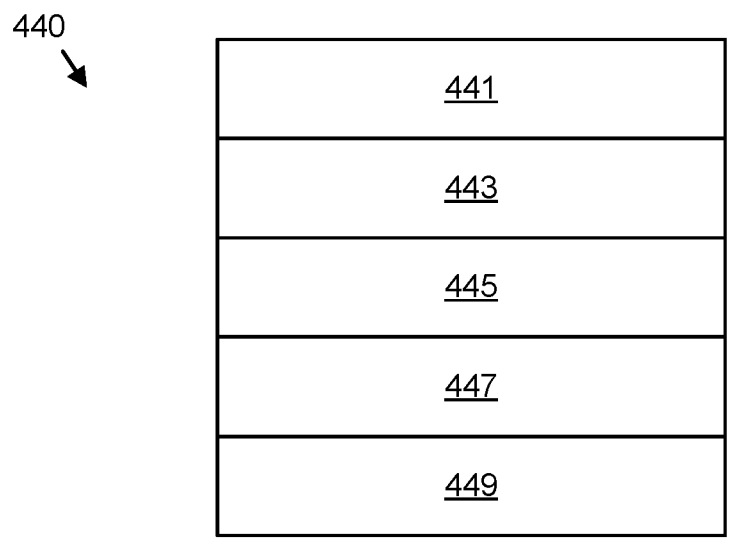
FIG. 4E is a schematic block diagram of utility tool data according to an embodiment.

FIG. 4E is a schematic block diagram of utility tool data 440. In the depicted embodiment, the utility tool data 440 includes general information 441 from the general input screen 429, input definitions 443 from the input screen 435, input verification rules 445 from the input screen 435, output definitions 447 from the output screen 433, and parameter definitions 449 from the parameter screen 431. In one embodiment, the input definitions 443 specify that bindings are one of required and not required for each function block input 277. The function block framework 125 may define one or more of the function block inputs 277, the function block outputs 263, and the function block parameters 273 from one or more of the general information 441, the input definitions 443, an input verification rules 445, the output definitions 447, and the parameters definitions 449.

Figure 5:
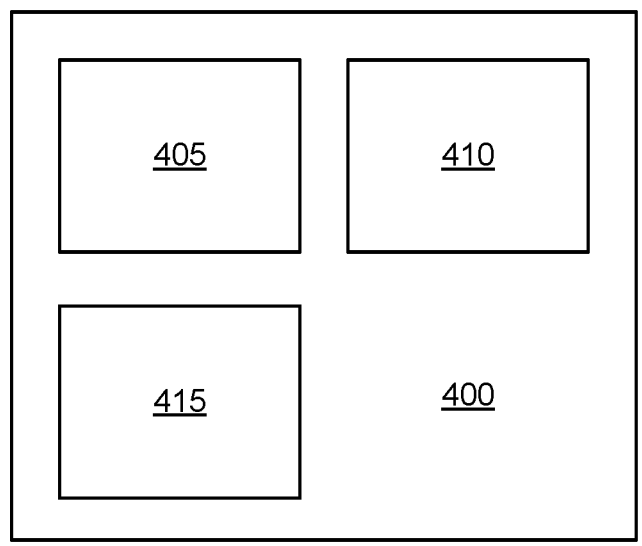
FIG. 5 is a schematic block diagram of a computer according to an embodiment.

FIG. 5 is a schematic block diagram of a computer 400. The computer 400 may generate the function block framework 125 and/or instantiate the function block framework 125 and the function block core 130 as the executable image 207. In addition, the computer 400 may be embodied in the automated test tool 225 and/or the logic engine 105. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices.

Figure 6A:
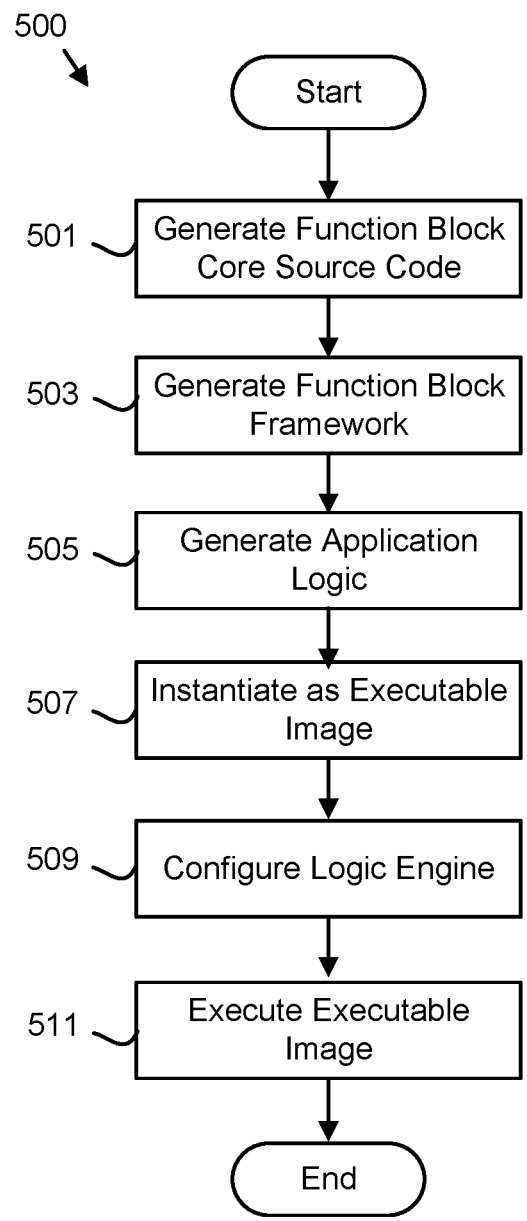
FIG. 6A is a schematic flow chart diagram of a executable image instantiating method according to an embodiment.

FIG. 6A is a schematic flow chart diagram of a executable image instantiating method 500. The method 500 may instantiate the function block framework 125 and the function block core 130 as the executable image 207. In addition, the method 500 may execute the executable image 207 with the logic engine 105. The method 500 may be performed by the processor 405 of the computer 400 and/or the logic engine 105.

The method 500 starts, and in one embodiment, the processor 405 generates 501 the function block core source code 319 for the function block core 130. The function block core source code 319 may be generated 501 by a source code editor.

The processor 405 may generate 503 the function block framework 125 for the hardware device 100 as shown in FIG. 3D. the function block framework 125 may be generated 503 using the utility tool 203. The function block framework 125 may comprise the function block framework source code 205 and the function block framework description 211. The function block framework 125 and the function block core 130 may be organized as object oriented code. In addition, the function block framework 125 and the function block core 130 may be stored as reusable library elements in the development library 219. In one embodiment, the function block framework 125 presents a standard interface to the function block core 130 executed by the logic engine 105. The generation 503 of the function block framework 125 is described in more detail in FIG. 6B.

In one embodiment, the processor 405 generates 505 the application logic 213. The generation 505 of the application logic 213 is described in more detail in FIG. 6D.

The processor 405 may instantiate 507 the function block framework 125 and the function block core 130 as the executable image 207 for the hardware device 100. In one embodiment, the function block framework source code 205 and the function block core function source code 319 are compiled and linked to form the executable image 207.

The processor 405 may configure 509 the logic engine 105 to execute the executable image 207 using the function block framework description 211. The processor 405 may define one or more ports, logical channels, data names, and the like to configure 509 the logic engine 105.

In one embodiment, the logic engine 105 executes 511 the executable image 207 and the method 500 ends. The execution 511 of the executable image 207 by the logic engine 105 may control the automation hardware 115 of the hardware device 100. In one embodiment, the hardware device 100 operates in an industrial environment.

The instantiation 507 of the executable image 207 is the result of a combined order of specific rules that render the information of the function block core source code 319 and the core functions 201 into the specific formats of the function block framework source code 205 and function block framework descriptions 211 of the function block framework 125. The specific rules further render the function block framework source code 205 and the function block framework descriptions 211 into the executable code 207 and the application logic 213 that execute on the hardware device 100. The specific process embodied in the specific rules enhance and improve the function of the computer 400.

Figure 6B:
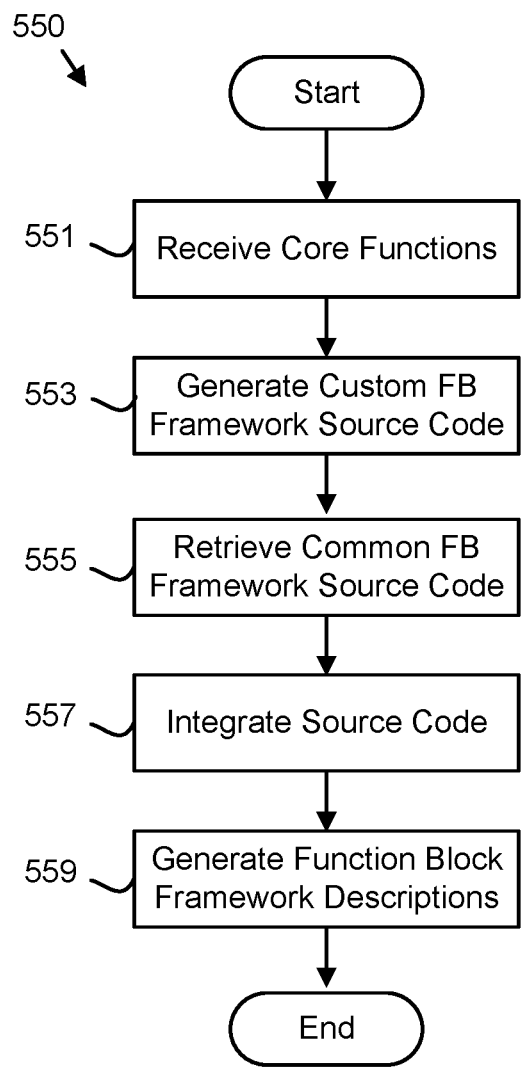
FIG. 6B is a schematic flow chart diagram of a function block framework generation method according to an embodiment.

FIG. 6B is a schematic flow chart diagram of a function block framework generation method 550. The method 550 may generate the function block framework 125. The method 550 may perform step 503 of FIG. 6A. The method 550 may be performed by the processor 405 of the computer 400.

The method 550 starts, and in one embodiment, the processor 405 receives 551 the core functions 201. The core functions 201 may be developed by the device developer. In one embodiment, the core functions 201 are developed using the utility tool 203. The core functions 201 may be developed via the user interfaces 421 of the utility tool 203. The core functions 201 may be custom core functions 201. The core functions 201 may include the general information 441, the input definitions 443, the input verification rules 445, the output definitions 447, and/or the parameter definitions 449.

The processor 405 may generate 553 custom function block framework source code 205 from the core functions 201. The function block framework source code 205 may be generated 553 with the user interface 421 of the utility tool 203. In addition, the function block framework 125 may be generated 503 using one or more of the graphical entry 425 and the tabular entry 423 of the user interface 421. In one embodiment, the processor 405 parses the core functions 201 into one or more atomic functions. In addition, the processor 405 may translate the atomic functions into the custom function block framework source code 205.

The processor 405 may further retrieve 555 common function block framework source code 205a from the development library 219. In one embodiment, the common function block framework source code 205a is referenced by the core functions 201. In addition, the common function block framework source code 205a may be referenced by the custom function block framework source code 205.

The processor 405 may integrate 557 the custom function block framework source code 205 and the common function block framework source code 205 as the function block framework source code 205. The function block framework source code 205 may include one or more of common function block framework source code 205a from the reusable library elements of custom function block framework source code 205.

The processor 405 may further generate 559 the function block framework description 211 from the core functions 201 and the method 550 ends. The processor 405 may identify configuration parameters 227 that interface the function block framework 125 to the core logic 130 and the logic engine 105.

Figure 6C:
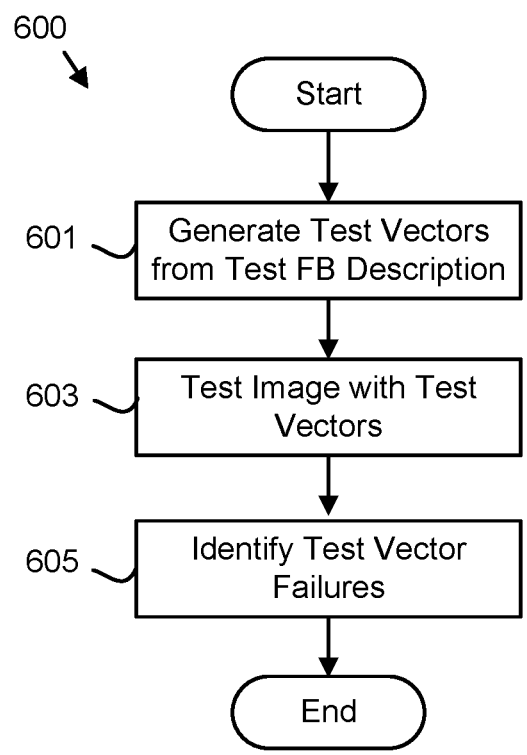
FIG. 6C is a schematic flow chart diagram of a function block test method according to an embodiment.

FIG. 6C is a schematic flow chart diagram of a function block test method 600. The method 600 may test the function block framework 125. The method 600 may be performed by the processor 405 of the computer 400 and/or the logic engine 105.

The method 600 starts, and in one embodiment, the processor 405 generates 601 test vectors 229 from the test function block description 223. The test vectors 229 may be organized to exercise each core function 201. In addition, the test vectors 229 may be organized to exercise the function block framework 125. In a certain embodiment, each test vector 229 includes one or more commands and data and one or more corresponding expected results.

The processor 405 may test 603 the executable image 207 with the test vectors 229. The processor 405 may communicate commands and data from the test vector 229 to the hardware device 100 and monitor results from the hardware device 100.

In one embodiment, the processor identifies 605 test vector failures and the method 600 ends. In one embodiment, the expected results from the test vector 229 do not match monitored results from the hardware device 100 in a test vector failure.

Figure 6D:
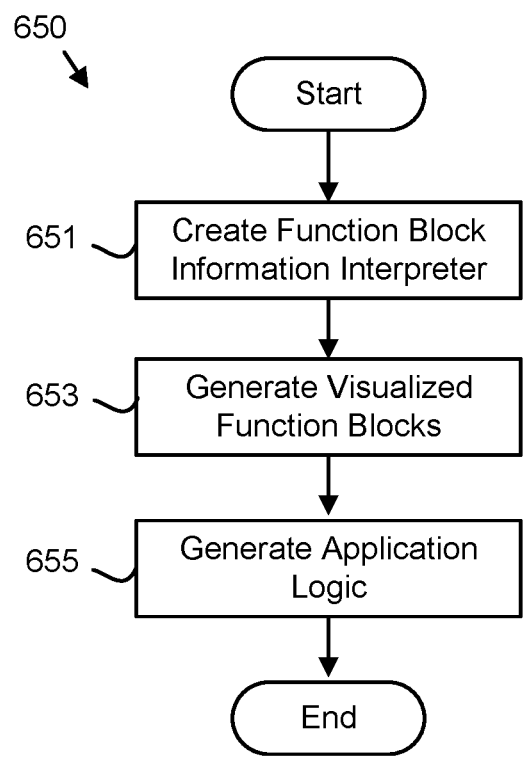
FIG. 6D is a schematic flow chart diagram of an application logic generation method according to an embodiment.

FIG. 6D is a schematic flow chart diagram of an application logic generation method 650. The method 650 may generate the application logic 213. In one embodiment, the method 650 performs step 505 of FIG. 6A. the method 650 may be performed by the processor 405 of the computer 400.

The method 650 starts, and in one embodiment, the processor 405 creates 651 the function block information interpreter 215. The function block information interpreter 215 may be based on the function block framework description 211. The function block framework description 211 may define one or more signal logic blocks, Boolean logic blocks, combination a logic blocks, Boolean equations, and the like.

The processor 405 may generate 653 the visualized function blocks 221 from the function block framework description 211 using the function block information interpreter 215. The function block information interpreter 215 may render the function block framework description 211 as visualized function blocks 221. The visualized function blocks 221 may depict a logic design, function blocks, and the like.

The processor 405 may generate 655 the application logic 213 from the visualized function blocks 221 and the method 650 ends. The application logic 213 may be generated 655 from common function blocks 155 from the common function block source code 205*a* and custom function blocks 155 from the function block framework source code 205. The application logic 213 may be generated 655 to interface the visualized function blocks 221 to the logic engine 105.

Problem/Solution

Developing custom automation and process control software for hardware devices 100 can be time-consuming and costly. Multiple developers with different expertise may asynchronously contribute to the automation and process control software. As a result, coordination of the software development is difficult.

The embodiments speed the development of function blocks 155 for hardware devices 100 by providing a standardized framework utilizing a series of development steps that allows multiple developers with expertise in specific areas to contribute to the final executable image 207. The embodiments further support improved verification and validation of the executable images 207. As a result, executable images 207 are developed more rapidly and with reduced bugs.

The embodiments further separate the development and release of function blocks 155 from the development and release of function block cores 130, simplifying the development of both function blocks 155 and function block cores 130. The embodiments also enable multiple different developers with different expertise to share functions blocks 155 and function block cores 130, reducing parallel development and increasing code quality.

This description uses examples to disclose the invention and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
  generating, by use of a processor, a function block framework for a hardware device, wherein the function block framework comprises function block framework source code and a function block framework description, the hardware device comprises a logic engine and automation hardware, and the function block framework presents a standard interface to a function block core executed by the logic engine, wherein the function block framework interfaces with a data table and a function block for the function block core;
  instantiating the function block framework and the function block core as an executable image for the hardware device;
  defining a logical channel for the executable image in the function block framework description;
  configuring the logic engine using the function block framework description; and
  controlling, by the logic engine, the automation hardware by executing the executable image to interface with the data table and the function block via the logical channel.

2. The method of claim 1, the method further comprising generating function block core source code for the function block core.

3. The method of claim 1, wherein the function block framework further comprises a test function block description that is employed by an automated test tool to test the executable image on the hardware device.

4. The method of claim 1, wherein the function block framework defines one or more of function block inputs, function block outputs, and function block parameters from one or more of general information, an input definition, an input verification rule, an output definition, and a parameter definition.

5. The method of claim 4, wherein the function block parameters comprise function block parameters with attribute identifiers and function block parameters without attribute identifiers, wherein function block parameters with attribute identifiers are accessible outside of the hardware device.

6. The method of claim 4, wherein the function block inputs are selected from one of input constants and table inputs from the data table.

7. The method of claim 6, wherein the data table comprises volatile memory and non-volatile memory and the function block framework specifies that the table inputs are from one of the volatile memory and the nonvolatile memory.

8. The method of claim 6, wherein the input definitions specify that bindings are one of required and not required for each function block input.

9. The method of claim 1, wherein the function block framework is generated with a user interface comprising one or more of a graphical entry and a tabular entry.

10. The method of claim 1, wherein the function block framework and the function block core are organized as object oriented code.

11. The method of claim 1, wherein the function block framework and the function block core are stored as reusable library elements.

12. The method of claim 11, wherein the function block framework source code comprises one or more of common function block framework source code from the reusable library elements and custom function block framework source code.

13. An apparatus comprising:
a processor;
a memory storing code executable by the processor to:
generate a function block framework for a hardware device, wherein the function block framework comprises function block framework source code and a function block framework description, the hardware device comprises a logic engine and automation hardware, and the function block framework presents a standard interface to a function block core executed by the logic engine, wherein the function block framework interfaces with a data table and a function block for the function block core;
instantiate the function block framework and the function block core as an executable image for the hardware device;
define a logical channel for the executable image in the function block framework description;
configure the logic engine using the function block framework description; and
control, by the logic engine, the automation hardware by executing the executable image to interface with the data table and the function block via the logical channel.

14. The apparatus of claim 13, the processor further generating function block core source code for the function block core.

15. The apparatus of claim 13, wherein the function block framework further comprises a test function block description that is employed by an automated test tool to test the executable image on the hardware device.

16. The apparatus of claim 13, wherein the function block framework defines one or more of function block inputs, function block outputs, and function block parameters from one or more of general information, an input definition, an input verification rule, an output definition, and a parameter definition.

17. A computer program product comprising a non-transitory computer readable storage medium having program code embodied therein, the program code readable/executable by a processor to:
generate a function block framework for a hardware device, wherein the function block framework comprises function block framework source code and a function block framework description, the hardware device comprises a logic engine and automation hardware, and the function block framework presents a standard interface to a function block core executed by the logic engine, wherein the function block framework interfaces with a data table and a function block for the function block core;
instantiate the function block framework and the function block core as an executable image for the hardware device;
define a logical channel for the executable image in the function block framework description;
configure the logic engine using the function block framework description; and
control, by the logic engine, the automation hardware by executing the executable image to interface with the data table and the function block via the logical channel.

18. The computer program product of claim 17, the processor further generating function block core source code for the function block core.

19. The computer program product of claim 17, wherein the function block framework further comprises a test function block description that is employed by an automated test tool to test the executable image on the hardware device.

20. The computer program product of claim 17, wherein the function block framework defines one or more of function block inputs, function block outputs, and function block parameters from one or more of general information, an input definition, an input verification rule, an output definition, and a parameter definition.

* * * * *